(12) United States Patent
Basov et al.

(10) Patent No.: US 10,949,107 B1
(45) Date of Patent: Mar. 16, 2021

(54) FRAGMENT FILLING FOR STORAGE SYSTEM WITH IN-LINE COMPRESSION

(71) Applicant: EMC IP Holding Company LLC, Hopkinton, MA (US)

(72) Inventors: Ivan Basov, Brookline, MA (US); Philippe Armangau, Acton, MA (US); Yining Si, Sherborn, MA (US); Christopher Alan Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 15/664,248

(22) Filed: Jul. 31, 2017

(51) Int. Cl.
*G06F 3/06* (2006.01)

(52) U.S. Cl.
CPC .............. *G06F 3/064* (2013.01); *G06F 3/067* (2013.01); *G06F 3/0608* (2013.01)

(58) Field of Classification Search
CPC ........ G06F 3/064; G06F 3/067; G06F 3/0608; G06F 3/0665; G06F 2212/401
See application file for complete search history.

(56) References Cited

U.S. PATENT DOCUMENTS

| 2009/0144496 | A1* | 6/2009 | Kawaguchi | G06F 3/0608 711/114 |
| 2017/0116215 | A1* | 4/2017 | Ramaiyer | G06F 16/23 |
| 2017/0336981 | A1* | 11/2017 | Garcia | G06F 3/0608 |

* cited by examiner

*Primary Examiner* — Gary W. Cygiel
(74) *Attorney, Agent, or Firm* — Ryan, Mason & Lewis, LLP

(57) ABSTRACT

Methods and apparatus are provided for reporting fragment filling in storage systems. An exemplary method comprises obtaining at least one compressed allocation unit of data in a storage system; reserving space for the at least one compressed allocation unit in a compressed segment based on a greater of (i) a size of the at least one compressed allocation unit, and (ii) a minimum target fragment length specified for at least one write operation class; and writing the at least one compressed allocation unit to the reserved space. An attempt is optionally first made to fill the at least one compressed allocation unit of data in a free extent and/or a hidden fragment of at least one compressed segment prior to reserving the space. The reserving the space is optionally only performed if the attempt to fill the at least one compressed allocation unit of data is not successful.

20 Claims, 4 Drawing Sheets

```
                                                        ┌─ 300
┌─────────────────────────────────────────────────────────┐
│ Upon a Write operation:                                 │
│                                                         │
│ 310: Obtain Minimum Target Fragment Length for at      │
│ least one Class of Write Operations;                   │
│                                                         │
│ 320: Compress one or more Allocation Units Associated  │
│ With Write Operation based on heuristics;              │
│                                                         │
│ 330: For one or more Compressed Allocation Units,      │
│ Attempt to Fragment Fill Compressed Allocation Units   │
│ in Existing Free Extents or Hidden Fragments;          │
│                                                         │
│ 340: If Attempted Fragment Fill of given Compressed    │
│ Allocation Unit was not successful, then reserve space │
│ for given Compressed Allocation Unit in compressed     │
│ segment based on a maximum of (i) an actual size of    │
│ the given Compressed Allocation Unit, and (ii) the     │
│ minimum target fragment length specified for the       │
│ current write operation class;                         │
│                                                         │
│ 350: Write given Compressed Allocation Unit to         │
│ reserved space.                                        │
└─────────────────────────────────────────────────────────┘
```

Upon a Write operation:

310: Obtain Minimum Target Fragment Length for at least one Class of Write Operations;

320: Compress one or more Allocation Units Associated With Write Operation based on heuristics;

330: For one or more Compressed Allocation Units, Attempt to Fragment Fill Compressed Allocation Units in Existing Free Extents or Hidden Fragments;

340: If Attempted Fragment Fill of given Compressed Allocation Unit was not successful, then reserve space for given Compressed Allocation Unit in compressed segment based on a maximum of (i) an actual size of the given Compressed Allocation Unit, and (ii) the minimum target fragment length specified for the current write operation class;

350: Write given Compressed Allocation Unit to reserved space.

FRAGMENT FILLING FOR STORAGE SYSTEM WITH IN-LINE COMPRESSION

FIELD

The present application relates to fragment filling in storage systems.

BACKGROUND

Some data storage systems employ data reduction techniques, such as compression, to improve storage efficiency. Compression may result in fragmentation when overwriting previously compressed blocks and the new compressed data does not fit into existing fragments. When the new compressed data cannot be written to a previously allocated slot, the new compressed data must be written to a new location, causing fragmentation and reduced space efficiency. A need exists for improved techniques for filling fragments with newly compressed data.

SUMMARY

Methods and apparatus are provided for reporting fragment filling in storage systems. In one embodiment, an exemplary method comprises obtaining at least one compressed allocation unit of data in a storage system; reserving space for the at least one compressed allocation unit in a compressed segment based on a greater of (i) a size of the at least one compressed allocation unit, and (ii) a minimum target fragment length specified for at least one write operation class; and writing the at least one compressed allocation unit to the reserved space.

In some embodiments, an attempt is first made to fill the at least one compressed allocation unit of data in a free extent and/or a hidden fragment of at least one compressed segment prior to reserving the space. The reserving the space is optionally only performed if the attempt to fill the at least one compressed allocation unit of data in the one or more of the free extent and the hidden fragment is not successful.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for a fragment filling process, according to one embodiment of the disclosure;

DETAILED DESCRIPTION

Figure 1:
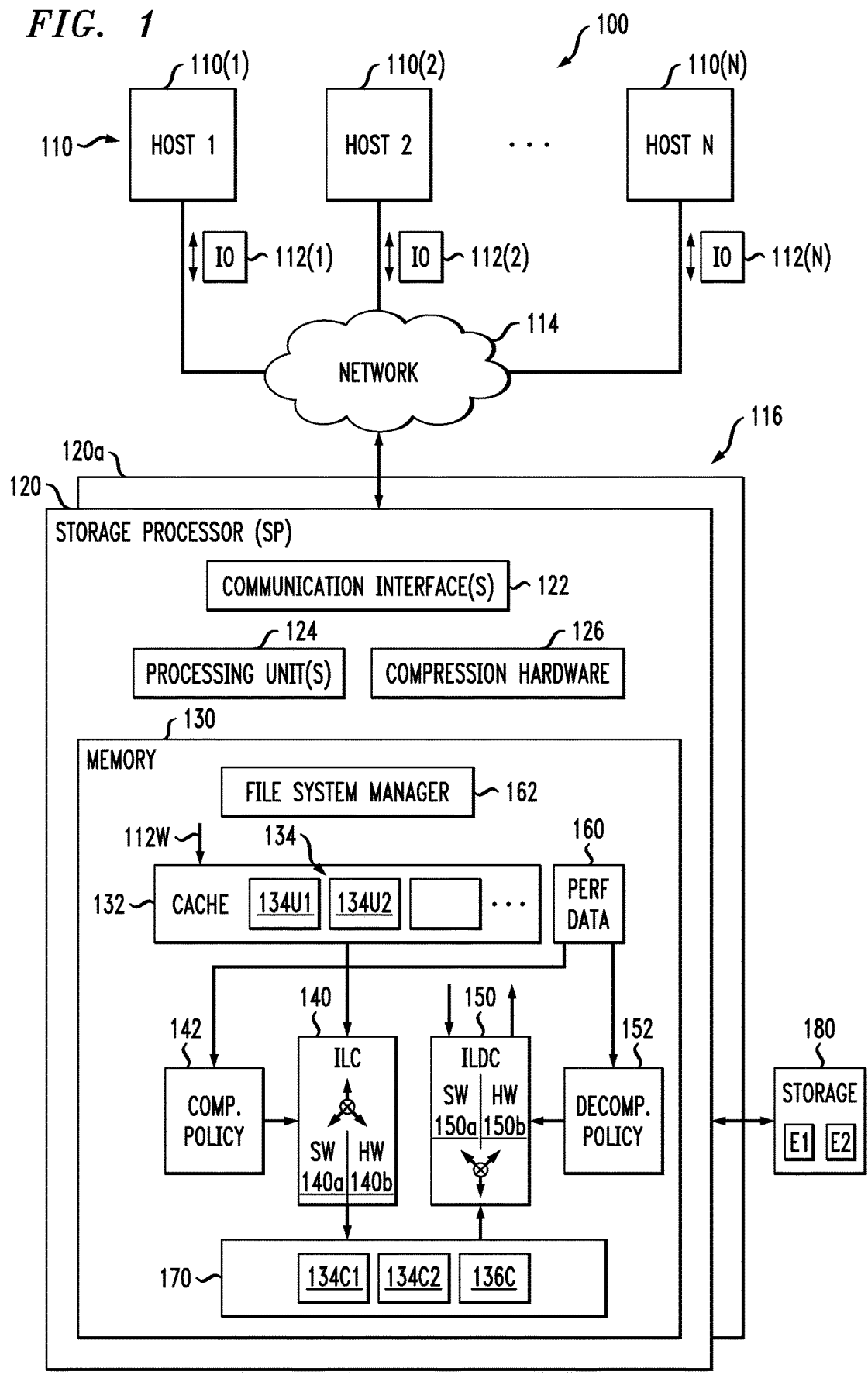
FIG. 1 is an example of an embodiment of a computer system that may utilize the techniques described herein.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for fragment filling in storage systems.

One or more embodiments of the disclosure provide improved fragment filling techniques. A minimum target fragment length is specified for one or more classes of write operations, such as full write operations, partial write operations and allocated write operations. When a new compressed data block (or compressed allocation unit) is obtained, space is reserved for the new compressed data block based on the greater of the actual size of the new compressed data block and the applicable minimum target fragment length.

Data reduction may be a LUN (logical unit number) attribute that can be enabled or disabled. When data reduction is enabled, data on a LUN may be processed as a background task. Compression, for example, may be performed in three different phases. The first phase comprises an initial compression that occurs when data compression is first enabled for a LUN. An entire LUN may be processed during this phase. The second phase is compression of new data that is sent by a host when the host sends a write request to a LUN. In such a case, the data is written in an uncompressed format and compressed asynchronously in background at a later time. As a result, when new data is written to a compressed LUN, the consumed capacity of the compressed LUN may increase temporarily because the new data is not written in a compressed format initially. Further, when a storage system receives a new write request directed to compressed data, the compressed data may need to be first uncompressed, the uncompressed data is updated with the new write request, and updated uncompressed data is compressed again. Alternatively, when a storage system receives a new write request directed to compressed data, the compressed data may be left as-is and new data may be written to a new location.

Inline compression (also referred to herein as "ILC") provides the ability to reduce the amount of storage required to store user data on a storage device of a storage system by compressing portions of the data at the time the data is first written to the storage device. Further, storage system resources such as CPU resources, that may otherwise remain unused, are utilized to perform inline data compression on a write data path indicating that data is compressed prior to writing the data on a storage device. Generally, ILC may optionally be enabled by default on a storage system. However, a user may be provided the ability to make a decision regarding which storage objects should be subject to compression. Further, ILC is intended to lower the cost of storage consumed (e.g., dollars per gigabytes ($/GB)), but it is also a goal for ILC to improve the cost based on a number of IO (input/output) operations performed in a storage system (IOPs (input/output operations) performed in a specific time) through better utilization.

Data storage systems commonly arrange data in file systems, and file systems commonly store data, as well as metadata, in blocks. As is known, a "block" is the smallest unit of storage that a file system can allocate. Blocks for a given file system are generally of fixed size, such as 4 KB (kilobytes), 8 KB, or some other fixed size.

File systems typically categorize blocks as either allocated or free. Allocated blocks are those which are currently in use, whereas free blocks are those which are not currently in use. As a file system operates, the file system tends to allocate new blocks, to accommodate new data, but the file system also tends to generate new free blocks, as previously allocated blocks become free. The file system may run utilities (e.g., space maker, file system reorganizer) to coalesce ranges of contiguous free blocks. For example, a utility may move data found in allocated blocks between areas of the file system to create large regions of entirely free blocks. In various examples, the file system may return such regions of free blocks to a storage pool; the file system may also make such regions available to accommodate new writes of sequential data.

In a storage system enabled with inline data compression, data of the file system is generally compressed down to sizes smaller than a block and such compressed data is packed together in multi-block segments. Further, a file system manager may include a persistent file data cache (PFDC) aggregation logic that selects a set of allocation units (also referred to herein as "data fragments" or "storage extents" or "blocks") for compressing the set of allocation units and organizes the compressed allocation units in a segment. Further, each compressed allocation unit in a segment may also be simply referred to herein as a fragment. Thus, data of a file system may be stored in a set of segments. A segment may be composed from multiple contiguous blocks where data stored in the segment includes multiple compressed storage extents having various sizes.

Further, for each compressed storage extent in a segment of a file system, a corresponding weight is associated where the weight is arranged to indicate whether the respective storage extent is currently part of any file in the file system. In response to performing a file system operation that changes the weight of a storage extent in a segment of a file system to a value that indicates that the storage extent is no longer part of any file in the file system, the storage extent is marked as a free storage extent such that a scavenging utility can scavenge free space at a later time.

Conventionally, when a file system operation causes a file system to update data stored in an allocation unit, new data is written to a new location by allocating a new data fragment in a new segment. In such a conventional system, in such an example, the old allocation unit remains unused and may be scavenged by a storage space scavenging utility (e.g., space maker or garbage collection) during background processing at a later time. Further, generally, a storage space scavenging utility frees storage space associated with unused allocation units if there are sufficient numbers of allocation units in a segment that can be scavenged. For example, when each allocation unit in a segment is marked as unused, a scavenging utility frees storage space associated with the segment. Thus, in such a conventional system, data of a file system may be scattered throughout a set of segments such that there exists unused allocation units within various segments that have not been scavenged yet.

Conventionally, by allocating a new extent or allocation unit each time data of an existing extent or allocation unit of a file system is updated causes the file system to become fragmented over time, whereby storage for files of the file system may be allocated in small block portions of the underlying LUNs (logical storage units). In such a conventional system, each such small block portion may denote a logically contiguous set of LUN blocks or locations where the different contiguous block portions may be scattered or fragmented through the logical address space of the underlying LUN(s). Further, in such a conventional system, once a file system is fragmented, new sequential writes may not find contiguous free block sets within the file system address space to be allocated for a file. Consequently, in such a conventional system, the foregoing may result in a performance bottleneck in file systems, for example, storing data of file systems on physical storage devices, such as rotating disk drives, as well as in cases where rotating disk drives may be used in combination with flash memory devices or other solid state storage devices. Thus, in such a conventional system, allocating a new extent each time a request is received to overwrite data of an existing extent leads to wasting a significant amount of storage space when a file system performs a large number of over-write operations and reduces overall storage space savings associating with compression of data. In addition, generally, processing bandwidth of a storage space scavenging utility (e.g., space maker utility) is limited in nature which induces a flash wear in a conventional storage system by repeatedly writing to flash storage devices. Further, in such a conventional system, in at least one scenario, for example, all blocks that make up a segment may be allocated, even though the segment may contain enough free space to encompass one or more blocks. Yet, in such a conventional system, when working on segments containing compressed data, storage space scavenging utilities may fail to properly identify these areas and may thus consume valuable storage system resources inefficiently.

By contrast, at least some implementations in accordance with the current technique enable a file system to re-use data fragments (or "allocation units") of a compressed segment for updating data stored in such data fragments. In at least one embodiment of the current technique, re-using data fragments in a compressed segment reduces the processing performed by a storage space scavenging utility (e.g., space maker, garbage collection utility) for freeing storage space in a storage stripe thereby reducing a flash wear on a flash storage device. Further, in at least one embodiment of the current technique, in a storage system enabled with inline data compression, an existing data fragment is overwritten with new updated data upon determining that the existing data fragment has not been shared among two or more files and the size of the existing data fragment can accommodate the new updated data in a compressed format resulting from a subsequent write I/O request. Further, in at least one embodiment of the current technique, when updated data is written to an existing data fragment by re-using the existing data fragment, the compressed data fragment is aligned to a disk sector level in order to avoid copy-on-write operation when such data fragment is re-used.

Described in following paragraphs are techniques that may be used in an embodiment in accordance with the techniques disclosed herein to efficiently use contiguous free block sets of file system address space that may be allocated for use, for example, for a file system.

FIG. 1 depicts an example embodiment of a system that may be used in connection with performing the techniques described herein. Here, multiple host computing devices ("hosts") 110, shown as devices 110(1) through 110(N), access a data storage system 116 over a network 114. The data storage system 116 includes a storage processor, or "SP," 120 and storage 180. In one example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable way.

In an example, the data storage system 116 includes multiple SPs, like the SP 120 (e.g., a second SP, 120a). The SPs may be provided as circuit board assemblies, or "blades," that plug into a chassis that encloses and cools the SPs. The chassis may have a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI (Internet Small Computer Systems Interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

As further shown in FIG. 1, the SP 120 includes one or more communication interfaces 122, a set of processing units 124, compression hardware 126, and memory 130. The communication interfaces 122 may be provided, for example, as SCSI target adapters and/or network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs.

The compression hardware 126 includes dedicated hardware, e.g., one or more integrated circuits, chipsets, subassemblies, and the like, for performing data compression and decompression in hardware. The hardware is "dedicated" in that it does not perform general-purpose computing but rather is focused on compression and decompression of data. In some examples, compression hardware 126 takes the form of a separate circuit board, which may be provided as a daughterboard on SP 120 or as an independent assembly that connects to the SP 120 over a backplane, midplane, or set of cables, for example. A non-limiting example of compression hardware 126 includes the Intel® QuickAssist Adapter, which is available from Intel Corporation of Santa Clara, Calif.

The memory 130 includes both volatile memory (e.g., RAM (random access memory)), and non-volatile memory, such as one or more ROMs (read only memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a cache 132, an inline compression (ILC) engine 140, an inline decompression (ILDC) engine 150, and a data object 170. A compression policy 142 provides control input to the ILC engine 140. A decompression policy 152 provides control input to the ILDC engine 150. Both the compression policy 142 and the decompression policy 152 receive performance data 160, that describes a set of operating conditions in the data storage system 116.

In an example, the data object 170 is a host-accessible data object, such as a LUN, a file system, or a virtual machine disk (e.g., a VVol (Virtual Volume), available from VMWare, Inc. of Palo Alto, Calif.). The SP 120 exposes the data object 170 to hosts 110 for reading, writing, and/or other data operations. In one particular, non-limiting example, the SP 120 runs an internal file system and implements the data object 170 within a single file of that file system. In such an example, the SP 120 includes mapping (not shown) to convert read and write requests from hosts 110 (e.g., IO requests 112(1-N)) to corresponding reads and writes to the file in the internal file system.

As further shown in FIG. 1, ILC engine 140 includes a software component (SW) 140*a* and a hardware component (HW) 140*b*. The software component 140*a* includes a compression method, such as an algorithm, which may be implemented using software instructions. Such instructions may be loaded in memory and executed by processing units 124, or some subset thereof, for compressing data directly, i.e., without involvement of the compression hardware 126. In comparison, the hardware component 140*b* includes software constructs, such as a driver and API (application programmer interface) for communicating with compression hardware 126, e.g., for directing data to be compressed by the compression hardware 126. In some examples, either or both components 140*a* and 140*b* support multiple compression algorithms. The compression policy 142 and/or a user may select a compression algorithm best suited for current operating conditions, e.g., by selecting an algorithm that produces a high compression ratio for some data, by selecting an algorithm that executes at high speed for other data, and so forth.

For decompressing data, the ILDC engine 150 includes a software component (SW) 150*a* and a hardware component (HW) 150*b*. The software component 150*a* includes a decompression algorithm implemented using software instructions, which may be loaded in memory and executed by any of processing units 124 for decompressing data in software, without involvement of the compression hardware 126. The hardware component 150*b* includes software constructs, such as a driver and API for communicating with compression hardware 126, e.g., for directing data to be decompressed by the compression hardware 126. Either or both components 150*a* and 150*b* may support multiple decompression algorithms. In some examples, the ILC engine 140 and the ILDC engine 150 are provided together in a single set of software objects, rather than as separate objects, as shown.

In one example operation, hosts 110(1-N) issue IO requests 112(1-N) to the data storage system 116 to perform reads and writes of data object 170. SP 120 receives the IO requests 112(1-N) at communications interface(s) 122 and passes them to memory 130 for further processing. Some IO requests 112(1-N) specify data writes 112W, and others specify data reads 112R, for example. Cache 132 receives write requests 112W and stores data specified thereby in cache elements 134. In a non-limiting example, the cache 132 is arranged as a circular data log, with data elements 134 that are specified in newly-arriving write requests 112W added to a head and with further processing steps pulling data elements 134 from a tail. In an example, the cache 132 is implemented in DRAM (Dynamic Random Access Memory), the contents of which are mirrored between SPs 120 and 120a and persisted using batteries. In an example, SP 120 may acknowledge writes 112W back to originating hosts 110 once the data specified in those writes 112W are stored in the cache 132 and mirrored to a similar cache on SP 120a. It should be appreciated that the data storage system 116 may host multiple data objects, i.e., not only the data object 170, and that the cache 132 may be shared across those data objects.

When the SP 120 is performing writes, the ILC engine 140 selects between the software component 140a and the hardware component 140b based on input from the compression policy 142. For example, the ILC engine 140 is configured to steer incoming write requests 112W either to the software component 140a for performing software compression or to the hardware component 140b for performing hardware compression.

In an example, cache 132 flushes to the respective data objects, e.g., on a periodic basis. For example, cache 132 may flush a given uncompressed element 134U1 to data object 170 via ILC engine 140. In accordance with compression policy 142, ILC engine 140 selectively directs data in element 134U1 to software component 140a or to hardware component 140b. In this example, compression policy 142 selects software component 140a. As a result, software component 140a receives the data of element 134U1 and applies a software compression algorithm to compress the data. The software compression algorithm resides in the memory 130 and is executed on the data of element 134U1 by one or more of the processing units 124. Software component 140a then directs the SP 120 to store the resulting compressed data 134C1 (the compressed version of the data in element 134U1) in the data object 170. Storing the compressed data 134C1 in data object 170 may involve both storing the data itself and storing any metadata structures required to support the data 134C1, such as block pointers, a compression header, and other metadata.

It should be appreciated that this act of storing data 134C1 in data object 170 provides the first storage of such data in the data object 170. For example, there was no previous storage of the data of element 134U1 in the data object 170. Rather, the compression of data in element 134U1 proceeds "inline," in one or more embodiments, because it is conducted in the course of processing the first write of the data to the data object 170.

Continuing to another write operation, cache 132 may proceed to flush a given element 134U2 to data object 170 via ILC engine 140, which, in this case, directs data compression to hardware component 140b, again in accordance with policy 142. As a result, hardware component 140b directs the data in element 134U2 to compression hardware 126, which obtains the data and performs a high-speed hardware compression on the data. Hardware component 140b then directs the SP 120 to store the resulting compressed data 134C2 (the compressed version of the data in element 134U2) in the data object 170. Compression of data in element 134U2 also takes place inline, rather than in the background, as there is no previous storage of data of element 134U2 in the data object 170.

In an example, directing the ILC engine 140 to perform hardware or software compression further entails specifying a particular compression algorithm. The algorithm to be used in each case is based on compression policy 142 and/or specified by a user of the data storage system 116. Further, it should be appreciated that compression policy 142 may operate ILC engine 140 in a pass-through mode, i.e., one in which no compression is performed. Thus, in some examples, compression may be avoided altogether if the SP 120 is too busy to use either hardware or software compression.

In some examples, storage 180 is provided in the form of multiple extents, with two extents E1 and E2 particularly shown. In an example, the data storage system 116 monitors a "data temperature" of each extent, i.e., a frequency of read and/or write operations performed on each extent, and selects compression algorithms based on the data temperature of extents to which writes are directed. For example, if extent E1 is "hot," meaning that it has a high data temperature, and the data storage system 116 receives a write directed to E1, then compression policy 142 may select a compression algorithm that executes at a high speed for compressing the data directed to E1. However, if extent E2 is "cold," meaning that it has a low data temperature, and the data storage system 116 receives a write directed to E2, then compression policy 142 may select a compression algorithm that executes at high compression ratio for compressing data directed to E2.

When SP 120 performs reads, the ILDC engine 150 selects between the software component 150a and the hardware component 150b based on input from the decompression policy 152 and also based on compatible algorithms. For example, if data was compressed using a particular software algorithm for which no corresponding decompression algorithm is available in hardware, the ILDC engine 150 may steer the compressed data to the software component 150a, as that is the only component equipped with the algorithm needed for decompressing the data. However, if both components 150a and 150b provide the necessary algorithm, then selection among components 150a and 150b may be based on decompression policy 152.

To process a read request 112R directed to compressed data 136C, the ILDC engine 150 accesses metadata of the data object 170 to obtain a header for the compressed data 136C. The compression header specifies the particular algorithm that was used to compress the data 136C. The ILDC engine 150 may then check whether the algorithm is available to software component 150a, to hardware component 150b, or to both. If the algorithm is available only to one or the other of components 150a and 150b, the ILDC engine 150 directs the compressed data 136C to the component that has the necessary algorithm. However, if the algorithm is available to both components 150a and 150b, the ILDC engine 150 may select between components 150a and 150b based on input from the decompression policy 152. If the software component 150a is selected, the software component 150a performs the decompression, i.e., by executing software instructions on one or more of the set of processors 124. If the hardware component 150b is selected, the hardware component 150b directs the compression hardware 126 to decompress the data 136C. The SP 120 then returns the resulting uncompressed data 136U to the requesting host 110.

It should be appreciated that the ILDC engine 150 is not required to use software component 150a to decompress data that was compressed by the software component 140a of the ILC engine 140. Nor is it required that the ILDC engine 150 use hardware component 150b to decompress data that was compressed by the hardware component 140b. Rather, the component 150a or 150b may be selected flexibly as long as algorithms are compatible. Such flexibility may be especially useful in cases of data migration. For example, consider a case where data object 170 is migrated to a second data storage system (not shown). If the second data storage system does not include compression hardware 126, then any data compressed using hardware on data storage system 116 may be decompressed on the second data storage system using software.

With the arrangement of FIG. 1, the SP 120 intelligently directs compression and other data reduction tasks to software or to hardware based on operating conditions in the data storage system 116. For example, if the set of processing units 124 are already busy but the compression hardware 126 is not, the compression policy 142 can direct more compression tasks to hardware component 140b. Conversely, if compression hardware 126 is busy but the set of processing units 124 are not, the compression policy 142 can direct more compression tasks to software component 140a. Decompression policy 152 may likewise direct decompression tasks based on operating conditions, at least to the extent that direction to hardware or software is not already dictated by the algorithm used for compression. In this manner, the data storage system 116 is able to perform inline compression using both hardware and software techniques, leveraging the capabilities of both while applying them in proportions that result in best overall performance.

In such an embodiment in which element 120 of FIG. 1 is implemented using one or more data storage systems, each of the data storage systems may include code thereon for performing the techniques as described herein.

Servers or host systems, such as 110(1)-110(N), provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN may be used to refer to the foregoing logically defined devices or volumes.

The data storage system may be a single unitary data storage system, such as single data storage array, including two storage processors or compute processing units. Techniques herein may be more generally used in connection with any one or more data storage systems each including a different number of storage processors than as illustrated herein. The data storage system 116 may be a data storage array, such as a Unity™, a VNX™ or VNXe™ data storage array by EMC Corporation of Hopkinton, Mass., including a plurality of data storage devices 116 and at least two storage processors 120a. Additionally, the two storage processors 120a may be used in connection with failover processing when communicating with a management system for the storage system. Client software on the management system may be used in connection with performing data storage system management by issuing commands to the data storage system 116 and/or receiving responses from the data storage system 116 over a connection. In one embodiment, the management system may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 116 provides block-based storage by storing the data in blocks of logical storage units (LUNs) or volumes and addressing the blocks using logical block addresses (LBAs). In other arrangements, the data storage system 116 provides file-based storage by storing data as files of a file system and locating file data using inode structures. In yet other arrangements, the data storage system 116 stores LUNs and file systems, stores file systems within LUNs, and so on.

As further shown in FIG. 1, the memory 130 includes a file system and a file system manager 162. A file system is implemented as an arrangement of blocks, which are organized in an address space. Each of the blocks has a location in the address space, identified by FSBN (file system block number). Further, such address space in which blocks of a file system are organized may be organized in a logical address space where the file system manager 162 further maps respective logical offsets for respective blocks to physical addresses of respective blocks at specified FSBNs. In some cases, data to be written to a file system are directed to blocks that have already been allocated and mapped by the file system manager 162, such that the data writes prescribe overwrites of existing blocks. In other cases, data to be written to a file system do not yet have any associated physical storage, such that the file system must allocate new blocks to the file system to store the data. Further, for example, FSBN may range from zero to some large number, with each value of FSBN identifying a respective block location. The file system manager 162 performs various processing on a file system, such as allocating blocks, freeing blocks, maintaining counters, and scavenging for free space.

In at least one embodiment of the current technique, an address space of a file system may be provided in multiple ranges, where each range is a contiguous range of FSBNs (File System Block Number) and is configured to store blocks containing file data. In addition, a range includes file system metadata, such as inodes, indirect blocks (IBs), and virtual block maps (VBMs), for example, as discussed further below in conjunction with FIG. 2. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IBs of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. However, it should be appreciated that data and metadata may be organized in other ways, or even randomly, within a file system. The particular arrangement described above herein is intended merely to be illustrative.

Further, in at least one embodiment of the current technique, ranges associated with an address space of a file system may be of any size and of any number. In some examples, the file system manager 162 organizes ranges in a hierarchy. For instance, each range may include a relatively small number of contiguous blocks, such as 16 or 32 blocks, for example, with such ranges provided as leaves of a tree. Looking up the tree, ranges may be further organized in CG (cylinder groups), slices (units of file system provisioning, which may be 256 MB or 1 GB in size, for example), groups of slices, and the entire file system, for example. Although ranges as described above herein apply to the lowest level of the tree, the term "ranges" as used herein may refer to groupings of contiguous blocks at any level.

In at least one embodiment of the technique, hosts 110(1-N) issue IO requests 112(1-N) to the data storage system 116. The SP 120 receives the IO requests 112(1-N) at the communication interfaces 122 and initiates further processing. Such processing may include, for example, performing read and write operations on a file system, creating new files in the file system, deleting files, and the like. Over time, a file system changes, with new data blocks being allocated and allocated data blocks being freed. In addition, the file system manager 162 also tracks freed storage extents. In an example, storage extents are versions of block-denominated data, which are compressed down to sub-block sizes and packed together in multi-block segments. Further, a file system operation may cause a storage extent in a range to be freed, e.g., in response to a punch-hole or write-split operation. Further, a range may have a relatively large number of freed fragments but may still be a poor candidate for free-space scavenging if it has a relatively small number of allocated blocks. With one or more candidate ranges identified, the file system manager 162 may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool. Thus, file system manager 162 may scavenge free space, such as by performing garbage collection, space reclamation, and/or free-space coalescing.

Figure 2:
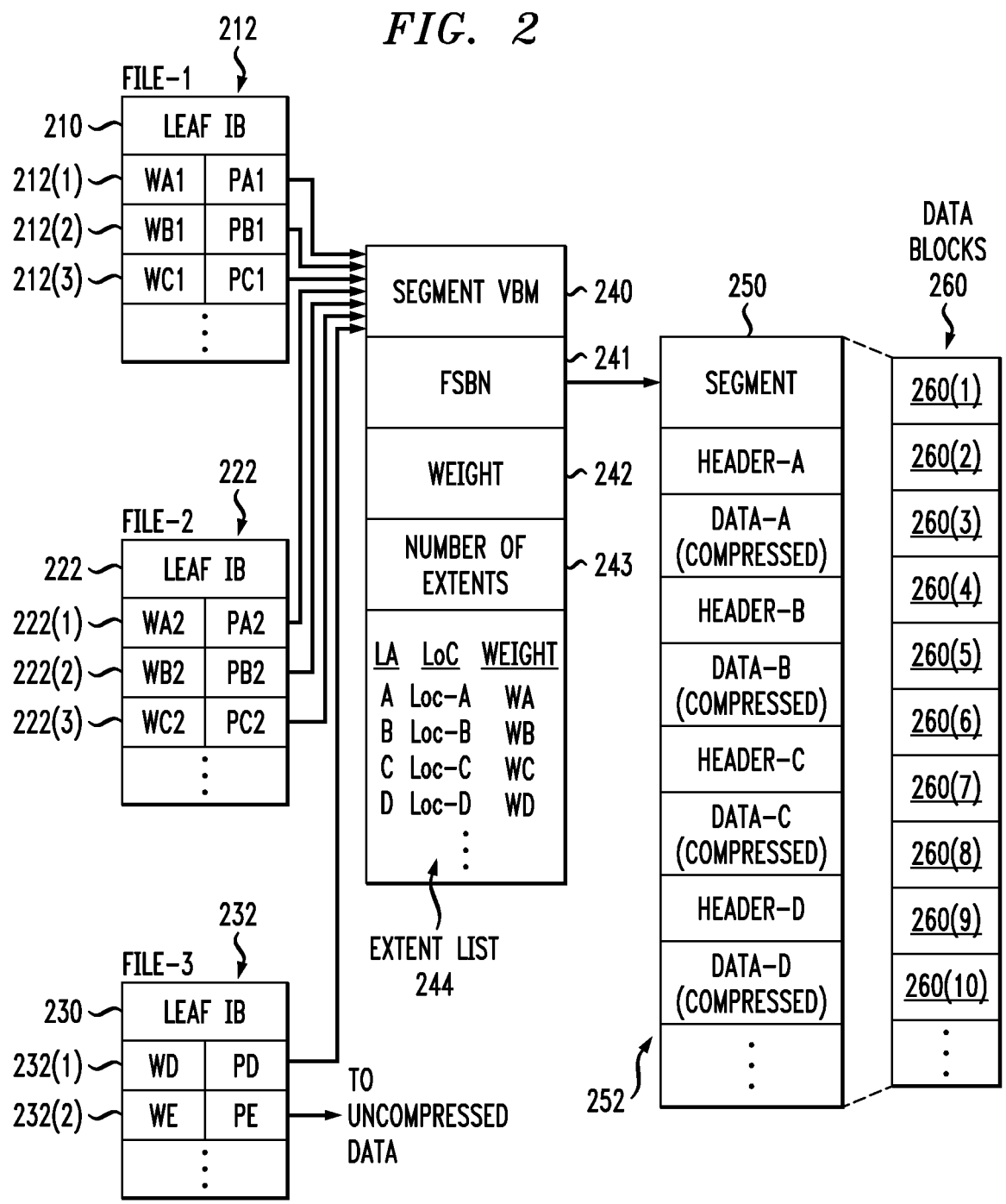
FIG. 2 illustrates in further detail components that may be used in connection with the techniques described herein, according to one embodiment of the disclosure.

Referring now to FIG. 2, shown is a more detailed representation of components that may be included in an embodiment using the techniques herein. As shown in FIG. 2, a segment 250 that stores data of a file system is composed from multiple data blocks 260. Here, exemplary segment 250 is made up of at least ten data blocks 260(1) through 260(10); however, the number of data blocks per segment may vary. In an example, the data blocks 260 are contiguous, meaning that they have consecutive FSBNs in a file system address space for the file system. Although segment 250 is composed from individual data blocks 260, the file system treats the segment 250 as one continuous space. Compressed storage extents 252, i.e., Data-A through Data-D, etc., are packed inside the segment 250. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes. Further, for each storage extent 252 in the segment 250, a corresponding weight is maintained, the weight arranged to indicate whether the respective storage extent 252 is currently part of any file in a file system by indicating whether other block pointers in the file system point to that block pointer.

The segment 250 has an address (e.g., FSBN 241) in the file system, and a segment VBM (Virtual Block Map) 240 points to that address. For example, segment VBM 240 stores a segment pointer 241, which stores the FSBN of the segment 250. By convention, the FSBN of segment 250 may be the FSBN of its first data block, i.e., block 260(1). Although not shown, each block 260(1)-260(10) may have its respective per-block metadata (BMD), which acts as representative metadata for the respective, block 260(1)-260(10), and which includes a backward pointer to the segment VBM 240.

As further shown in FIG. 2, the segment VBM 240 stores information regarding the number of extents 243 in the segment 250 and an extent list 244. The extent list 244 acts as an index into the segment 250, by associating each compressed storage extent 252, identified by logical address (e.g., LA values A through D, etc.), with a corresponding location within the segment 250 (e.g., Location values Loc-A through Loc-D, etc., which indicate physical offsets) and a corresponding weight (e.g., Weight values WA through WD, etc.). The weights provide indications of whether the associated storage extents are currently in use by any files in the file system. For example, a positive number for a weight may indicate that at least one file in the file system references the associated storage extent 252. Conversely, a weight of zero may mean that no file in the file system currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight (e.g., Weight values WA through WD, etc.) for a storage extent 252 reflects a sum, or "total distributed weight," of the weights of all block pointers in the file system that point to the associated storage extent. In addition, the segment VBM 240 may include an overall weight 242, which reflects a sum of all weights of all block pointers in the file system that point to extents tracked by the segment VBM 240. Thus, in general, the value of overall weight 242 should be equal to the sum of all weights in the extent list 242.

Various block pointers 212, 222, and 232 are shown to the left in FIG. 2. In an example, each block pointer is disposed within a leaf IB (Indirect Block), also referred to herein as a mapping pointer, which performs mapping of logical addresses for a respective file to corresponding physical addresses in the file system. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration. Although a single leaf IB 210 is shown for file-1, the file-1 may have many leaf IBs, which may be arranged in an IB tree for mapping a large logical address range of the file to corresponding physical addresses in a file system to which the file belongs. A "physical address" is a unique address within a physical address space of the file system.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D stored in segment 250 and pointer value PE points to Data-E stored outside the segment 250. File F3 does not appear to have a snapshot relationship with either of files F1 or F2. If one assumes that data block sharing for the storage extents 252 is limited to that shown, then, in an example, the following relationships may hold:

WA=WA1+WA2;
WB=WB1+WB2;
WC=WC1+WC2;
WD=WD; and
Weight 242=ΣWi (for i=a through d, plus any additional extents 252 tracked by extent list 244).

The detail shown in segment 250 indicates an example layout 252 of data items. In at least one embodiment of the current technique, each compression header is a fixed-size data structure that includes fields for specifying compression parameters, such as compression algorithm, length, CRC (cyclic redundancy check), and flags. In some examples, the header specifies whether the compression was performed in hardware or in software. Further, for instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C.

For performing writes, the ILC engine 140 generates each compression header (Header-A, Header-B, Header-C, etc.) when performing compression on data blocks 260, and directs a file system to store the compression header together with the compressed data. The ILC engine 140 generates different headers for different data, with each header specifying a respective compression algorithm. For performing data reads, a file system looks up the compressed data, e.g., by following a pointer 212, 222, 232 in the leaf IB 210, 220, 230 to the segment VBM 240, which specifies a location within the segment 250. A file system reads a header at the specified location, identifies the compression algorithm that was used to compress the data, and then directs the ILDC 150 to decompress the compressed data using the specified algorithm.

In at least one embodiment of the current technique, for example, upon receiving a request to overwrite and/or update data of data block (Data-D) pointed to by block pointer 232(a), a determination is made as to whether the data block (Data-D) has been shared among any other file. Further, a determination is made as to whether the size of the compressed extent (also referred to herein as "allocation unit") storing contents of Data-D in segment 250 can accommodate the updated data. Based on the determination, the updated data is written in a compressed format to the compressed extent for Data-D in the segment 250 instead of allocating another allocation unit in a new segment.

For additional details regarding the data storage system of FIGS. 1 and 2, see, for example, U.S. patent application Ser. No. 15/393,331 (now U.S. Pat. No. 10,157,006), filed Dec. 29, 2016, "Managing Inline Data Compression in Storage Systems," incorporated by reference herein in its entirety.

FIG. 3 illustrates exemplary pseudo code for a fragment filling process 300, according to one embodiment of the disclosure. As shown in FIG. 3, the exemplary fragment filling process 300 is initiated upon a write operation. During step 310, the fragment filling process 300 obtains a minimum target fragment length specified for at least one class of write operations (e.g., full, partial, or allocated write operations).

The exemplary fragment filling process 300 then compresses one or more allocation units associated with write operation during step 320, optionally based on heuristics. For example, a heuristic may specify that if a predefined number of consecutive allocation units are found to be not compressible, then suspend compression for a predefined number of allocation units.

For one or more compressed allocation units, the exemplary fragment filling process 300 attempts to fragment fill the compressed allocation units in existing free extents or hidden fragments during step 330. If the fragment fill attempt is successful, then the fragment filling process 300 terminates.

If, however, the attempted fragment fill of given compressed allocation unit was not successful, then the fragment filling process 300 reserves space for a given compressed allocation unit in a compressed segment during step 340 based on a maximum of (i) an actual size of the given compressed allocation unit, and (ii) the minimum target fragment length specified for the current write operation class.

The given compressed allocation unit is then written to the reserved space during step 350 and program control terminates.

CONCLUSION

One or more embodiments of the disclosure provide methods and apparatus for fragment filling in storage systems. In one or more embodiments, fragment filling techniques are provided that improve the storage efficiency of storage systems by employing a minimum target fragment length specified for at least one write operation class.

The foregoing applications and associated embodiments should be considered as illustrative only, and numerous other embodiments can be configured using the techniques disclosed herein, in a wide variety of different applications.

It should also be understood that the disclosed techniques for fragment filling, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for fragment filling may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as data storage system 116, or portions thereof, are illustratively implemented for use by tenants of such a multi-tenant environment.

Cloud infrastructure as disclosed herein can include cloud-based systems such as AWS, GCP and Microsoft Azure™. Virtual machines provided in such systems can be used to implement at least portions of data storage system 116 in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the fragment filling devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
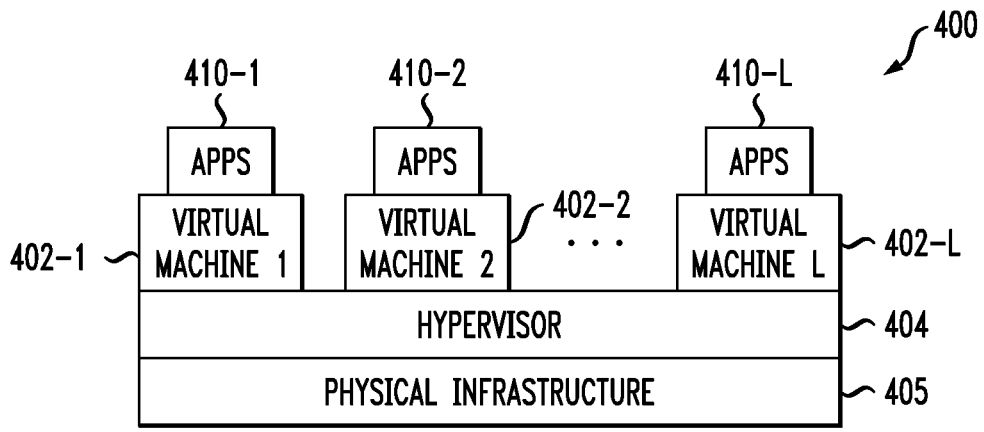
FIG. 4 illustrates an exemplary processing platform that may be used to implement at least a portion of one or more embodiments of the disclosure comprising a cloud infrastructure.

Referring now to FIG. 4, one possible processing platform that may be used to implement at least a portion of one or more embodiments of the disclosure comprises cloud infrastructure 400. The cloud infrastructure 400 in this exemplary processing platform comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

The cloud infrastructure 400 may encompass the entire given system or only portions of that given system, such as one or more of client, servers, controllers, or computing devices in the system.

Although only a single hypervisor 404 is shown in the embodiment of FIG. 4, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 404 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed fragment filling systems may each run on a computer, server, storage device or other processing platform element. A given such element may be viewed as an example of what is more generally referred to herein as a "processing device." The cloud infrastructure 400 shown in FIG. 4 may represent at least a portion of one processing platform.

Figure 5:
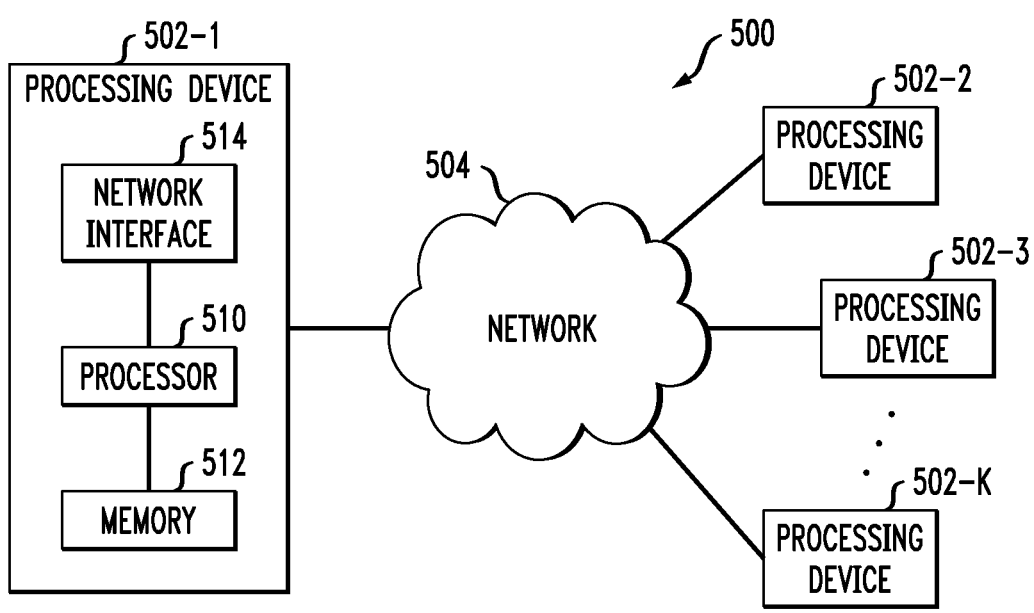
FIG. 5 illustrates another exemplary processing platform that may be used to implement at least a portion of one or more embodiments of the disclosure.

Another example of a processing platform is processing platform 500 shown in FIG. 5. The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network, a LAN, a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of pseudo code shown in FIG. 3 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, and fragment filling platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of minimum target fragment lengths, each minimum target fragment length specified for a respective one of a plurality of classes of write operations;
compressing one or more allocation units of data associated with a write operation to obtain at least one compressed allocation unit of data in a storage system, wherein the write operation corresponds to one of the classes of write operations;
determining that at least one existing allocation unit of at least one compressed segment of said storage system cannot be filled with said at least one compressed allocation unit of data, wherein said at least one existing allocation unit comprises at least one of a free fragment and a hidden fragment; and
in response to said determining:
reserving space for said at least one compressed allocation unit in a compressed segment of said storage system, wherein a size of said reserved space is a greater of (i) a size of said at least one compressed allocation unit, and (ii) the minimum target fragment length specified for the write operation class corresponding to said write operation, wherein the plurality of minimum target fragment lengths comprises a first minimum target fragment length specified for a class of full write operations and a second minimum target fragment length specified for a class of partial write operations, wherein said first minimum target fragment length is different than said second minimum target fragment length; and
writing said at least one compressed allocation unit of data to at least a portion of said reserved space in the compressed segment.

2. The method of claim 1, wherein a third minimum target fragment length is specified for a class of allocated write operations.

3. The method of claim 2, wherein the third minimum target fragment length is different from both the first minimum target fragment length and the second minimum target fragment length.

4. The method of claim 1, wherein the step of compressing one or more allocation units associated with said write operation is selectively performed based on one or more heuristics.

5. The method of claim 1, wherein the step of reserving space is only performed if it is determined that the at least one existing allocation unit of at least one compressed segment of said storage system cannot be filled.

6. The method of claim 1, wherein the storage system is enabled with inline compression.

7. The method of claim 1, wherein the compressed segment comprises a set of contiguous allocation units having at least two different sizes.

8. The method of claim 1, wherein each of the first minimum target fragment length and the second minimum target fragment length have a fixed size.

9. A computer program product, comprising a non-transitory machine-readable storage medium having encoded therein executable code of one or more software programs, wherein the one or more software programs when executed by at least one processing device perform the following steps:

obtaining a plurality of minimum target fragment lengths, each minimum target fragment length specified for a respective one of a plurality of classes of write operations;

compressing one or more allocation units of data associated with a write operation to obtain at least one compressed allocation unit of data in a storage system, wherein the write operation corresponds to one of the classes of write operations;

determining that at least one existing allocation unit of at least one compressed segment of said storage system cannot be filled with said at least one compressed allocation unit of data, wherein said at least one existing allocation unit comprises at least one of a free fragment and a hidden fragment; and in response to said determining:

reserving space for said at least one compressed allocation unit in a compressed segment of said storage system, wherein a size of said reserved space is a greater of (i) a size of said at least one compressed allocation unit, and (ii) the minimum target fragment length specified for the write operation class corresponding to said write operation, wherein the plurality of minimum target fragment lengths comprises a first minimum target fragment length specified for a class of full write operations and a second minimum target fragment length specified for a class of partial write operations, wherein said first minimum target fragment length is different than said second minimum target fragment length; and writing said at least one compressed allocation unit of data to at least a portion of said reserved space in the compressed segment.

10. The computer program product of claim 9, wherein the step of compressing one or more allocation units associated with said write operation is selectively performed based on one or more heuristics.

11. The computer program product of claim 9, wherein the step of reserving space is only performed if it is determined that the at least one existing allocation unit of at least one compressed segment of said storage system cannot be filled.

12. The computer program product of claim 9, wherein the storage system is enabled with inline compression.

13. The computer program product of claim 9, wherein a third minimum target fragment length is specified for a class of allocated write operations.

14. The computer program product of claim 9, wherein the compressed segment comprises a set of contiguous allocation units having at least two different sizes.

15. A system, comprising:

a memory; and at least one processing device, coupled to the memory, operative to implement the following steps:

obtaining a plurality of minimum target fragment lengths, each minimum target fragment length specified for a respective one of a plurality of classes of write operations;

compressing one or more allocation units of data associated with a write operation to obtain at least one compressed allocation unit of data in a storage system, wherein the write operation corresponds to one of the classes of write operations;

determining that at least one existing allocation unit of at least one compressed segment of said storage system cannot be filled with said at least one compressed allocation unit of data, wherein said at least one existing allocation unit comprises at least one of a free fragment and a hidden fragment; and in response to said determining:

reserving space for said at least one compressed allocation unit in a compressed segment of said storage system, wherein a size of said reserved space is a greater of (i) a size of said at least one compressed allocation unit, and (ii) the minimum target fragment length specified for the write operation class corresponding to said write operation, wherein the plurality of minimum target fragment lengths comprises a first minimum target fragment length specified for a class of full write operations and a second minimum target fragment length specified for a class of partial write operations, wherein said first minimum target fragment length is different than said second minimum target fragment length; and writing said at least one compressed allocation unit of data to at least a portion of said reserved space in the compressed segment.

16. The system of claim 15, wherein a third minimum target fragment length is specified for a class of operations.

17. The system of claim 16, wherein the third minimum target fragment length is different from both the first minimum target fragment length and the second minimum target fragment length.

18. The system of claim 15, wherein the step of compressing one or more allocation units associated with said write operation is selectively performed based on one or more heuristics.

19. The system of claim 15, wherein the step of reserving space is only performed if it is determined that the at least one existing allocation unit of at least one compressed segment of said storage system cannot be filled.

20. The system of claim 15, wherein the storage system is enabled with inline compression.

* * * * *